United States Patent [19]

Bauer

[11] Patent Number: 5,399,073

[45] Date of Patent: Mar. 21, 1995

[54] COMPRESSOR UNIT WITH CONDENSATE FILTER AND OIL DISPOSAL SYSTEM

[75] Inventor: Heinz Bauer, Munich, Germany

[73] Assignee: Bauer-Kompressoren GmbH, Munich, Germany

[21] Appl. No.: 187,905

[22] Filed: Jan. 28, 1994

[51] Int. Cl.[6] .............................................. F04B 39/04
[52] U.S. Cl. ....................................... 417/313; 261/99; 261/104
[58] Field of Search ................... 417/313; 261/99, 104, 261/107, 154; 55/267

[56] References Cited

U.S. PATENT DOCUMENTS

| 1,672,571 | 6/1928 | Leonard | 418/85 |
|---|---|---|---|
| 2,361,393 | 10/1944 | Fafeman et al. | 55/269 |
| 2,838,294 | 6/1958 | Skerritt | 261/99 |
| 2,840,183 | 6/1958 | George | 55/267 |
| 3,083,952 | 4/1963 | Goodloe et al. | 261/99 |
| 3,785,755 | 1/1974 | Novak et al. | 55/267 |
| 3,898,922 | 8/1975 | Savage | 98/115 R |
| 3,905,729 | 9/1975 | Bauer | 418/84 |
| 4,007,601 | 2/1977 | Webbon | 261/104 |
| 4,394,113 | 7/1983 | Bammert | 418/98 |
| 4,450,900 | 5/1984 | Nathan | 55/267 |
| 4,732,585 | 3/1988 | Lerner | 261/154 |
| 4,738,805 | 4/1988 | Lawson | 261/24 |
| 4,774,032 | 9/1988 | Coates et al. | 261/104 |
| 5,033,944 | 7/1991 | Lassota | 418/1 |
| 5,087,178 | 2/1992 | Wells | 418/1 |
| 5,133,904 | 7/1992 | Pepper | 261/99 |

Primary Examiner—Richard A. Bertsch
Assistant Examiner—Peter Korytnyk
Attorney, Agent, or Firm—Sixbey, Friedman, Leedom & Ferguson

[57] ABSTRACT

A compressor unit that has a compressor component and a condensate filter that is used to precipitate water and oil condensed from a compressed gas stream. For the environmentally friendly disposal of the condensate, a filter device containing a filter material is arranged so that a warm air stream entering the filter device after passing through the condensate filter condenses the water in the filtrate stream. The condensate is soaked up in the filter device by the filter material and, with the help of the air stream, which can be the warmed outgoing air of a cooling device of the compressor component, the water contained in the condensate is evaporated, while the oil-containing components of the condensate are adsorbed in the filter material for subsequent disposal. The filter material is preferably placed in the filter device in the form of filter elements arranged preferably in several rows behind one another at predetermined distances in the direction in which air flows through. The filter element can be designed as an osmotic filter cloth which is formed as tubes or it can be made of spiral-shaped, wound sheets of such filter material. Suitably, the filter device with the filter material contained in it is designed as a replaceable, disposable device, for example in the form of a module.

18 Claims, 4 Drawing Sheets

COMPRESSOR UNIT WITH CONDENSATE FILTER AND OIL DISPOSAL SYSTEM

BACKGROUND OF THE INVENTION

The invention relates to a compressor unit comprising a compressor component and a condensate filter used to precipitate water and oil from the gas stream condensed by the compressor component.

DESCRIPTION OF RELATED ART

In a compressor unit of the type to which the invention is directed, the condensate of water and oil precipitated from the condensed gas stream, such as compressed air, is trapped in the condensate filter and collected. Occasionally, this condensate must be drained from the condensate filter to be able to maintain the operability of the condensate filter. Since this condensate contains oil, among other things, because of increasingly strict disposal regulations, it must be taken into consideration that the condensate cannot merely be drained off into the environment, but must, instead, be sent to a special disposal facility suitable for oil-containing substances. This is associated, in particular, with difficulties in so-called transportable compressor units used, among other things, for filling compressed air tanks as are used in scuba diving, for example.

Thus, there is a need for compressor units that provide simplified condensate disposal.

SUMMARY OF THE INVENTION

The primary object of the present invention is, thus, to provide a compressor unit that makes it possible to dispose of condensate in a structurally simple, but efficient, way while overcoming the above-described difficulties.

According to preferred embodiments of the invention, for this purpose, a compressor unit with a compressor component and a condensate filter to precipitate water and oil from the condensed gas stream utilizes a filter device containing a filter material which is arranged so that an air stream warmed by sweeping over the compressor component vaporizes the water in the filtrate stream entering the filter device after passing through the condensate filter.

In the compressor unit according to the invention, the filtrate stream is thus conveyed from the condensate filter into a filter device in which the condensate made of water and oil is soaked up with the help of the filter material in the filter device and then the previously warmed air stream vaporizes the water, while oil is adsorbed in the filter material. In this way, in the compressor unit according to the invention, the condensate is subsequently treated so that the water is vaporized and the oil is retained to a large extent in the filter material. As such, the amount of condensate accumulating during the operation of the compressor unit is reduced with the help of the filter device because the water is vaporized with the help of the air stream and is carried away. The filter material needs to be replaced after considerably prolonged operating periods and is then disposed of according to regulations for oil-containing substances or optionally regenerated. Thus, the compressor unit according to the invention makes it possible subsequently to treat the condensate that accumulates in an environmentally friendly way.

Preferably, the filter material comprises several filter elements arranged approximately parallel to one another at a distance from, but approximately perpendicular to, the air stream passing through the filter device. These filter elements, advantageously, are preferably made of spiral-shaped, wound filter material, with a hollow space is defined within the filter material. Alternatively, osmotic filter cloth tubes can also be used as the filter elements.

To keep the filter elements at about the same, predetermined distance, suitably, a spacer is provided. In filter elements made of spiral-shaped wound filter material, for this purpose, preferably, at least one strainer is provided in whose holes the filter elements are placed in a predetermined way.

In a design of the filter element as an osmotic filter cloth tube, preferably, a spacer is used that has several predetermined, conical projections on which the respective filter cloth tubes, serving as filter elements, are placed.

Alternatively, the filter material can be corrugated and be placed at several, spaced positions in the filter device. The filter material is preferably a highly absorbent nonwoven fabric.

When individual filter elements that are made, for example, of osmotic filter cloth tubes, are used as the filter material, then the filter elements are placed one behind another in the direction of the air stream in at least two rows, to improve the efficiency of the filter device of the compressor unit. Of course, more than two rows can also be provided, which depends in any case on the space available to hold the filter device.

The amount of condensate accumulating from the condensate filter also depends on the performance of the compressor components or on the overall performance of the compressor unit. The filter device is of course adapted, with respect to its operation, to the conditions present in the respective compressor unit.

If the filter elements are arranged in at least two or more rows behind one another, viewed in the direction of the air stream, then the design is preferably made so that the filter elements of one row are placed at gaps between the filter elements of an adjacent row. In this way, with as compact as possible a design of the filter device, a highly efficient arrangement can be achieved.

Depending on the shape of the compressor unit, outgoing air or ambient air is used as the warm air stream in the filter device.

If the compressor unit contains a cooling fan by which the ambient air is conveyed over the compressor component for cooling, this air stream, that was warmed by passing by the compressor component, is used before exiting the compressor unit as outgoing air that sweeps over the filter material in the filter component in the compressor unit according to the invention. In particular, compact compressor units, such as those intended for mobile use, e.g., for scuba diving, have such a cooling fan built in. With such a design, the air warmed by the compressor component, thus, can be used on the outgoing air side of the filter device according to the invention for disposal of the condensate. This double use of the warmed outgoing air makes it possible to achieve an extremely energy-saving and efficient functioning of the filter device.

Preferably, the condensate is fed, in the compressor unit according to the invention, near the bottom of the filter devices, so that it is possible further to convey the condensate with the help of gravity, from the condensate filter to the filter device in the compressor unit according to the invention.

Advantageously, the filter device can have a bowl-shaped housing, made as a condensate-collecting bowl, in which the filter material is placed. This housing, preferably, also serves as an outside covering of the compressor unit on the outgoing air side thereof. Preferably, the elevation of the compressor unit here is exploited for the effective working surfaces of the filter material or of the filter elements without significantly increasing the depth of the compressor unit.

Preferably the compressor unit according to the invention is designed so that the filter device is integrated into it so that a compressor unit with a compact design is achieved, and the filter material or the filter elements in the filter device are arranged to be easily accessible.

Advantageously, the filter device with the filter material contained in it is designed as a module that can be replaced as a unit, so that clean disposal of the filter is guaranteed. This module can then be destroyed or regenerated in a way according to regulations.

Of course the invention is not limited to the indicated details of the preferred embodiments, but combinations, especially with respect to the design of the filter material in the filter device, can be used in the compressor unit according to the invention.

Thus, these and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

In the figures of the drawing, the same or similar parts are provided with the same reference symbols, with prime (') designations denoting elements which differ from one embodiment to the other.

DETAILED DESCRIPTION OF THE PREFERRED EMBODIMENTS

Figure 1:
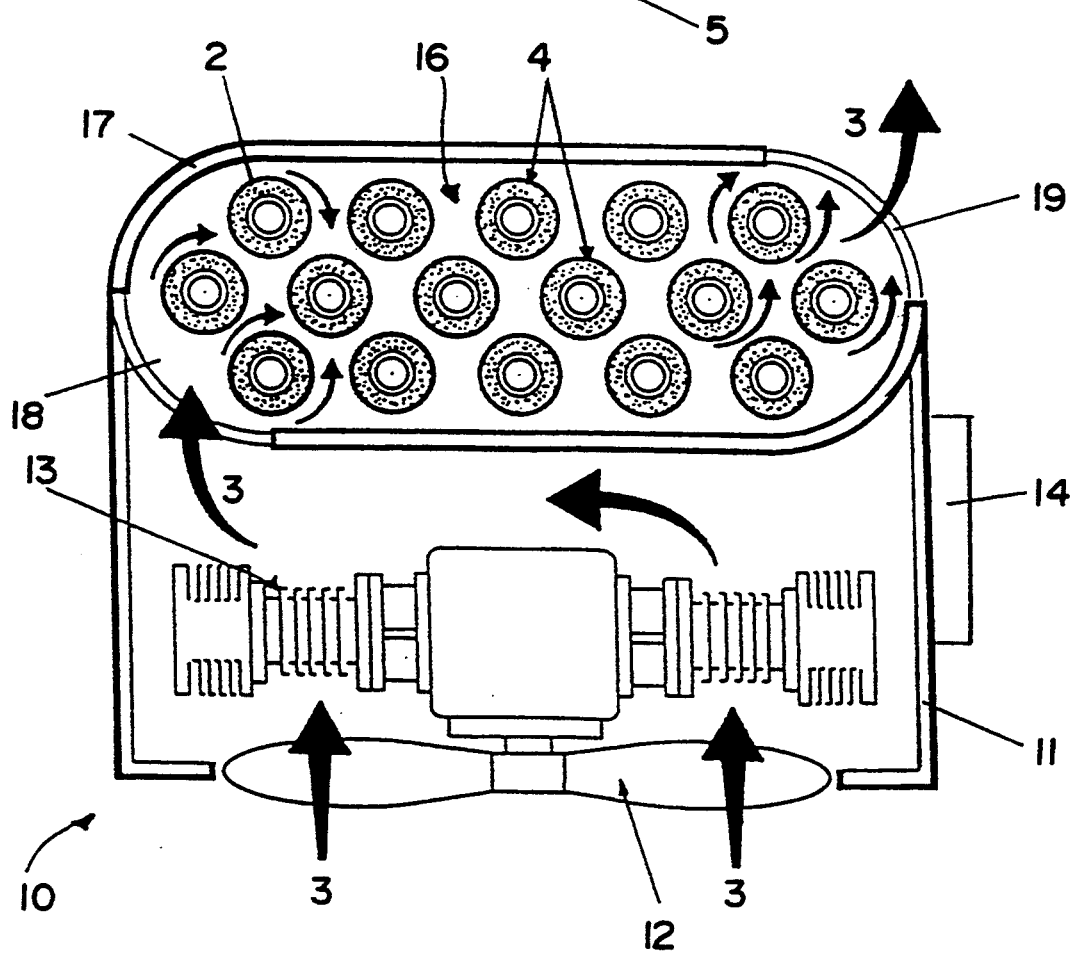
FIG. 1 is a diagrammatic top view of a compressor unit according to the invention represented in partial section.
Figure 4:
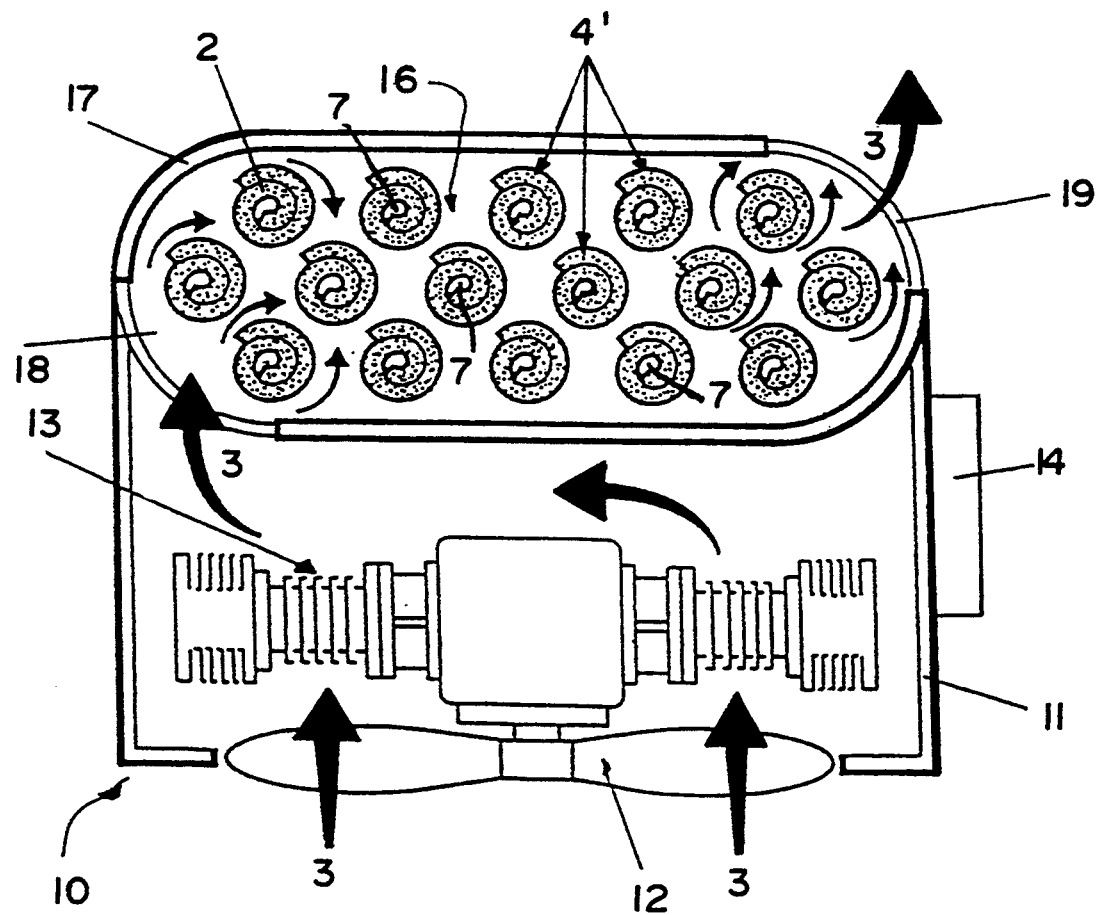
FIG. 4 is a top view, similar to that of FIG. 1, showing a second preferred embodiment of a compressor unit with an integrated filter device according to the invention.

In FIGS. 1 and 4, a compressor unit according to the invention is designated overall by 10. The type of compressor used as an example in illustration is a so-called compact compressor unit that preferably is intended for mobile use. In a diagrammatically represented housing 11, which is designed approximately as a rectangular solid, a cooling fan 12 is placed on a longitudinal side. Further, a diagrammatically indicated compressor component 13 is placed in the housing 11. The compressor component 13 can be, for example, of the reciprocating piston type or the like, and can be designed as a single-stage or multistage compressor.

The condensed gas stream, such as the compressed air stream, supplied by compressor component 13, is conveyed to a diagrammatically indicated condensate filter 14 in which, in a conventional manner, precipitation of the liquid components, such as water and oil, from the compressed gas stream is performed before the compressed gas stream is fed to its predetermined use. The condensate accumulating at condensate filter 14 contains predominantly oil and water. This condensate, designated by 15, is introduced near a bottom of a filter device designated overall by 16 and is collected, as can be seen from FIGS. 2 and 3, as well as 5 and 6, in a bowl-shaped housing part 17, acting as a collecting bowl, of filter device 16. In filter device 16 there is placed a filter material designated overall by 2 that is capable of soaking up the condensate consisting of water and oil in filter device 16 and distributing it over a large surface area inside filter device 16.

As can be seen from FIGS. 1 and 4, and the arrows 3 shown there, the ambient air moved by cooling fan 12 is conveyed over compressor component 13, by which it is warmed. By passing over the compressor component 13, air stream 3 is warmed, and then is conveyed through an air inlet 18, for example, on the left side in FIGS. 1 and 4, into the filter device 16. The warmed air stream 3 sweeps over the outside surfaces of filter material 2, vaporizing the water in the condensate that has been soaked up by filter material 2. The oil-containing components are adsorbed by the filter material 2 and retained thereby. After the air stream passes through filter device 16, in which filter material 2 acts as a baffle, the outgoing air of cooling fan 12 exits through an air outlet 19 that is provided, for example, in FIGS. 1 and 4, on the right side, i.e., air outlet 19 is offset as far as possible from air inlet 18. The liquid vapor the help of air stream 3 in filter device 16 is carried along by this air stream and released into the environment. On the other hand, the oil-containing substances remain behind on filter material 2, so that the air stream leaving filter device 16 can be released into the environment without pollution. With this design of compressor unit 10, the air warmed by compressor component 13 is thus used on the outgoing-air side for condensate disposal.

Figure 2:
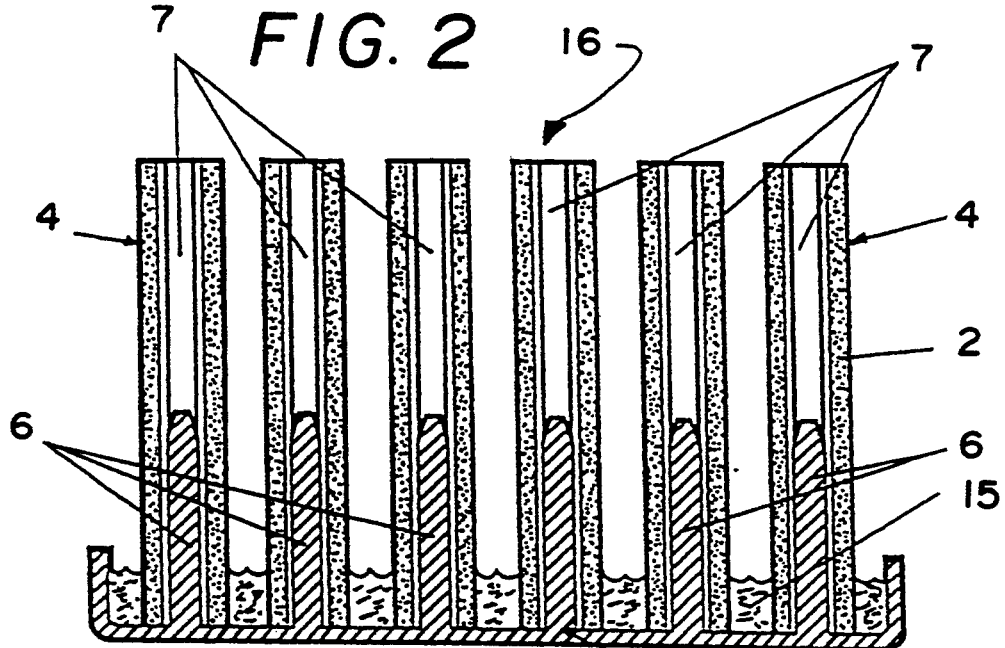
FIG. 2 is a longitudinal sectional view of the area of the filter device in the compressor unit according to FIG. 1, illustrating a first embodiment of filter elements in the filter device shown in FIG. 1.
Figure 3:
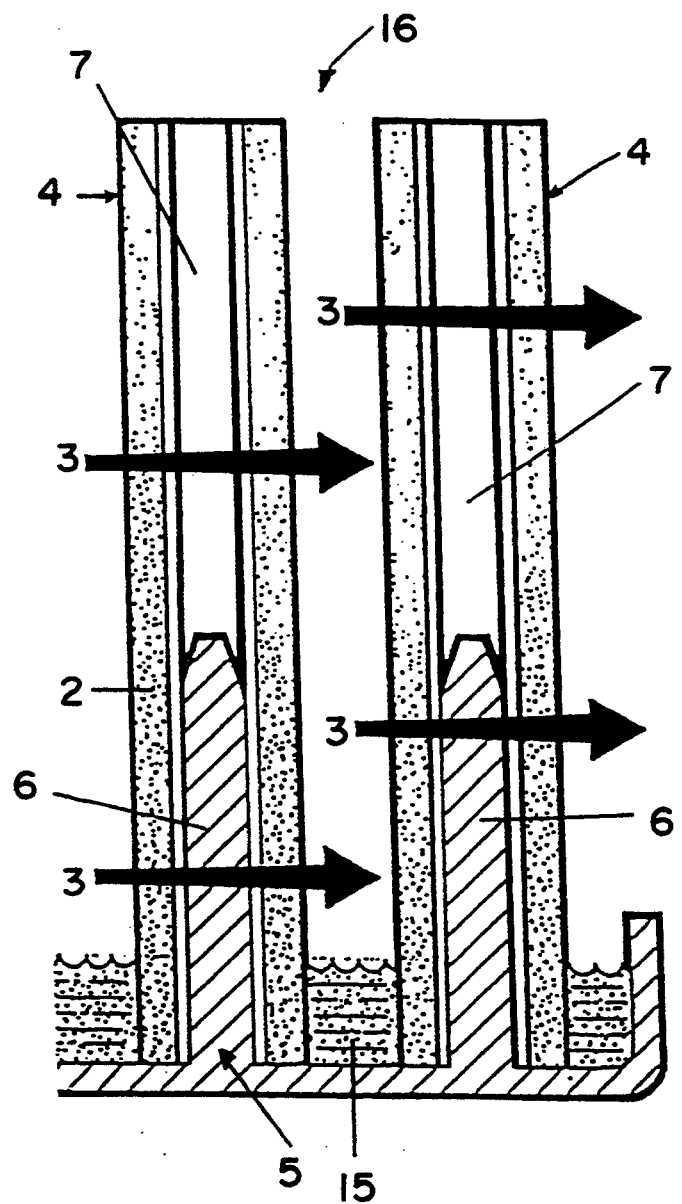
FIG. 3 is an enlarged cross-sectional view of a portion of the filter device shown in FIG. 2, illustrating the operation of the filter device.

With reference to FIGS. 1 to 3, a first preferred embodiment for arranging the filter material 2 in filter device 16 is illustrated. Filter material 2 has several individual filter elements 4 made, for example, of osmotic filter cloth tubes as are known in the art. It can be seen from FIG. 1 that these filter elements 4 are arranged in three rows one behind the another, viewed in the direction of air stream 3, in the interior of filter device 16. Filter elements 4 of one row are placed, for example, at gaps between filter elements 4 of an adjacent row. Filter elements 4 are suitably placed at uniform distances per respective row, for which purpose a spacer 5 can be provided that has conical projections 6 on which filter elements 4 can be placed. These conical projections 6 are suitably formed on one of the housing parts of filter device 16. Air stream 3 goes by and through filter elements 4, and the condensate rising in them, due to the osmotic effect of filter element 4, is dried by air stream 3, i.e., the water contained in condensate 15 is vaporized or evaporated and then carried along by air stream 3.

Figure 5:
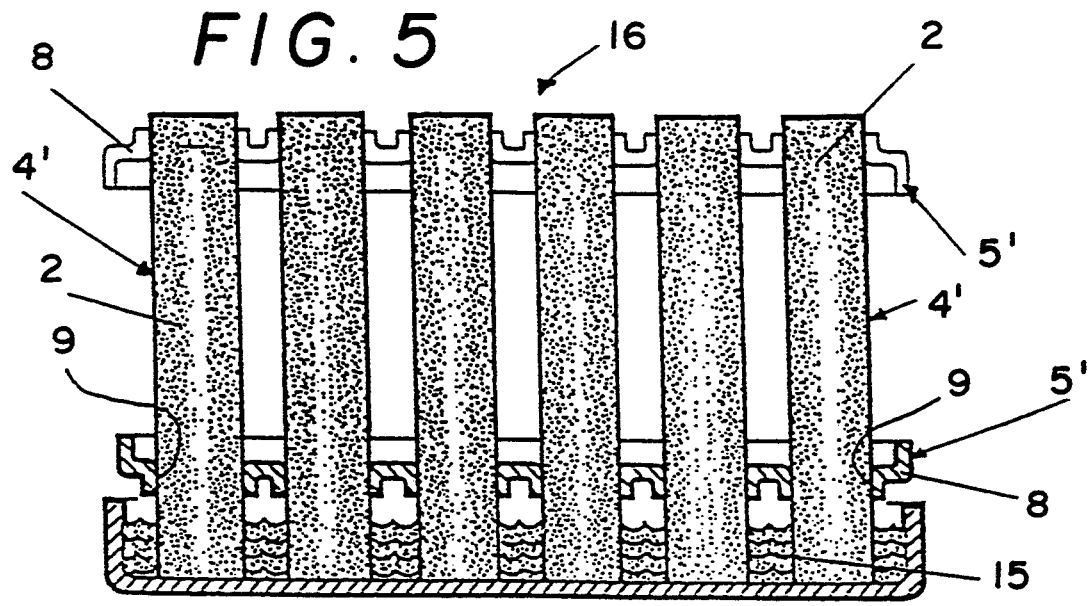
FIG. 5 is a longitudinal sectional view of the area of the filter device in the compressor unit according to FIG. 4, showing second preferred embodiment of filter elements.
Figure 6:
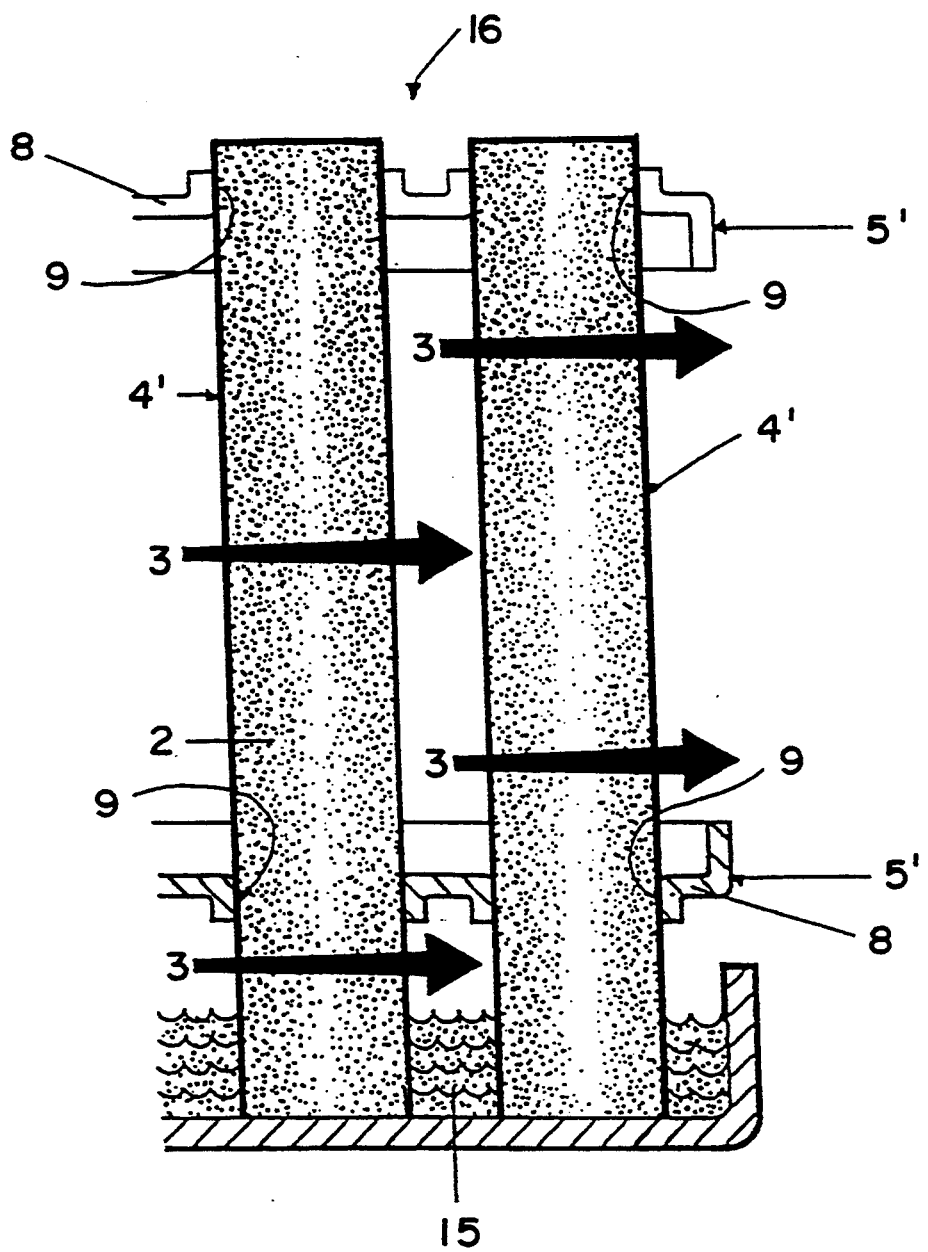
FIG. 6 is an enlarged cross-sectional view of a portion of the filter device shown in FIG. 5, illustrating the operation of the second embodiment of the filter device.

With reference to FIGS. 4 to 6, a second preferred embodiment for arranging the filter material 2 in filter device 16 in compressor unit 10 according to the invention is illustrated. The filter elements 4' shown of this embodiment are wound, spiral-shaped, from filter material 2 so that a hollow space 7 is present approximately in the middle. The staggered arrangement of the rows of these filter elements 4' is essentially the same as in the embodiment explained above.

As can be seen from FIGS. 5 and 6, a pair of spaced sieve-shaped members 8 are provided as spacers 5'. The members 8 have a predetermined arrangement, openings 9 into which filter elements 4' are inserted. With the help of these sieves-shaped members 8, filter elements 4' are provided in filter device 16 in the arrangement shown, for example, in FIG. 4 in top view.

As can be seen by arrows 3, in particular from FIG. 6, the functioning of filter elements 4' is essentially the same as for the filter elements 4 explained above.

Although the invention was explained above based on preferred embodiments, the invention is of course not limited to the details described there, but rather numerous changes and modifications are possible that one skilled in the art will find if needed without going beyond the concept of the invention. In particular, deviating from the embodiments represented, the filter material 2 in filter device 16 can be present, optionally, in a corrugated form and in the form of several layers, lying at a distance behind one another, extending in the direction of air stream 3 (it being sufficient to provide members 5' with longitudinally-extending, serpentine slots instead of sieve openings to support such layers). The invention is not limited either to the integrated arrangement of filter device 16 shown but, depending on the design of compressor unit 10, another arrangement can also be provided in which, for example, filter device 16 forms a separate component in a compressor unit. Such a design is suitable especially for large compressor units.

Essential according to the invention is that the condensate containing oil and water accumulating in the compressor unit is disposed of so that the components that are harmful to the environment are preferably removed by vaporization or evaporation with the help of filter device 16, while components such as oil or the like that are critical with respect to disposal are separated from the condensate stream and absorbed. In this way, condensate disposal that is easily manageable and meets the increasingly strict regulations is made possible in such compressor units 10. Advantageously, the filter device is designed as a replaceable module that can be replaced in a user-friendly way and then, can be disposed of in accordance with governmental regulations. The module acts as a disposable device for the environmentally friendly disposal of the condensate. Therefore, this invention is not limited to the details shown and described herein, and includes all such changes and modifications as are encompassed by the scope of the appended claims.

I claim:

1. Compressor unit with a compressor for producing a compressed gas stream, a condensate filter for removing water and oil condensed from the compressed gas stream and means for causing a stream of air to sweep over the compressor so as to be warmed thereby; wherein a filter device containing a filter material receives condensate filtered by the condensate filter and is arranged in the path of the air stream which sweeps over the compressor in a manner enabling the air stream to vaporize water in the condensate received by the filter device from the condensate filter.

2. Compressor unit according to claim 1, wherein the filter material comprises a plurality of filter elements arranged in rows approximately parallel to one another at a distance from, but approximately perpendicular to, the air stream from the condensate filter.

3. Compressor unit according to claim 2, wherein at least one spacer is provided for supporting the filter elements in the filter device.

4. Compressor unit according to claim 3, wherein the at least one spacer comprises at least one sieve-shaped member.

5. Compressor unit according to claim 4, wherein each filter element is formed of a spiral-shaped, wound sheet of the filter material.

6. Compressor unit according to claim 2, wherein the filter elements are arranged in at least two rows one behind another in a flow direction of the air stream.

7. Compressor unit according to claim 6, wherein the filter elements of one row are located at gaps between filter elements of an adjacent row.

8. Compressor unit according to claim 6, wherein said means for causing a stream of air to sweep over the compressor is a cooling fan located on an upstream side of the compressor and the filter device is located on a downstream side of the compressor, so that the air stream flows from the cooling fan, over the compressor, to the filter device.

9. Compressor unit according to claim 3, wherein a hollow space is formed in the interior of each filter element.

10. Compressor unit according to claim 9, wherein each filter element is formed of an osmotic filter cloth tube.

11. Compressor unit according to claim 10, wherein the spacer is provided with a plurality of conical projections, and wherein each filter cloth tube is support on a respective one of the conical projections.

12. Compressor unit according to claim 1, wherein the filter material is corrugated and arranged in several, spaced layers.

13. Compressor unit according to claim 1, wherein the filter material is a highly absorbent nonwoven fabric.

14. Compressor unit according to claim 1, wherein the condensate is received near a bottom area of the filter device.

15. Compressor unit according to claim 1, wherein the filter device has a bowl-shaped housing forming a condensate-collecting bowl in which the filter material is located.

16. Compressor unit according to claim 1, wherein filter device is integrated into the compressor unit.

17. Compressor unit according to claim 1, wherein an air inlet and an air outlet of the filter device are provided offset to one another.

18. Compressor unit according to claim 1, wherein the filter device with the filter material contained in it is in the form of a module that can be replaced as a unit.

* * * * *